United States Patent Office 3,564,077
Patented Feb. 16, 1971

3,564,077
THERMOPLASTIC POLYESTER MOLDING
COMPOSITIONS
Ludwig Brinkmann and Walter Herwig, Frankfurt am
Main, Germany, assignors to Farbwerke Hoechst Aktiengesellschaft vormals Meister Lucius & Brüning,
Frankfurt am Main, Germany, a corporation of Germany
No Drawing. Filed July 11, 1968, Ser. No. 743,945
Claims priority, application Germany, July 20, 1967,
F 53,033
Int. Cl. C08g 39/10
U.S. Cl. 260—873
7 Claims

ABSTRACT OF THE DISCLOSURE

Molding compositions which can be processed thermoplastically and which have a high impact strength are prepared from linear saturated polyesters and copolymers of styrene and conjugated aliphatic dienes.

The present invention provides thermoplastic molding compositions of polyesters. It is known that polyester molding compositions containing linear saturated polyesters of aromatic dicarboxylic acids can be processed into crystalline shaped articles. For example, polyethylene terephthalate can be injection molded to give shaped articles of which the speed of crystallization and degree of crystallinity can be influenced by the addition of suitable nucleating agents. The shaped articles thus obtained have a moderate impact strength.

It is known to admix polypropylene or poly-4-methylpentene-1 to polyesters. Molding compositions of improved dimensional stability are obtained.

Thermoplastic molding compositions have now been found consisting of a mixture of:

(a) linear saturated polyesters of aromatic dicarboxylic acids and optionally of small quantities of aliphatic dicarboxylic acids with saturated aliphatic or cycloaliphatic diols, and
(b) copolymers of styrene or its alkyl derivatives and conjugated aliphatic dienes, with the copolymers being admixed in amounts of 0.1 to 30, preferably 0.5 to 10% by weight relative to the total mixture.

The surprising feature of this is that the impact strength of these products is increased without their hardness, abrasion resistance and solvent resistance being unfavorably affected.

This finding is above all surprising because of the fact that the mixture components are structurally completely different.

In this process, polyethylene terephthalate is preferably used as the linear saturated polyetser of aromatic dicarboxylic acids and saturated aliphatic or cycloaliphatic diols.

It is also possible to use other polyesters, for example polycyclohexane-1,4-dimethylol terephthalate. It is also possible to use modified polyethylene terephthalates which in addition to terephthalate acid also contain other aromatic, or also aliphatic, dicarboxylic acids, for example naphthalenedicarboxylic acids or adipic acid. It is furthermore possible to use modified polyethylene terephthalates which in addition to ethylene glycol also contain other aliphatic diols, such as for example butane diol-1,4 or neopentyl glycol.

The polyesters have a reduced specific viscosity, dl./g., measured in a 1% strength solution, phenol/tetrachlorethane, 60:40, at 25° C., of between 0.6 and 2.0, preferably between 0.9 to 1.6.

It is also possible to start from polyesters of low reduced specific viscosity and to bring about the desired higher viscosity by post-condensation during the mixing process.

A copolymer of styrene or alkyl styrenes with a conjugated diene is admixed to the polyester.

Alkyl styrenes may be used which are substituted in the nucleus or also in the side-chain. Particularly suitable compounds are those of the following general formula:

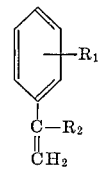

in which $R_1$ represents a hydrogen atom, an alkyl group having from 4 to 12 carbon atoms, $R_2$ represents a hydrogen atom or an alkyl group having 1 to 4 carbon atoms, with at least one R being an alkyl group.

The aliphatic conjugated dienes to be used may be linear or branched and should contain at least one terminal double bond.

Preferably, compounds of the following general formula are used:

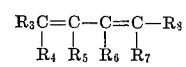

$R_3$, $R_4$, $R_5$, $R_6$, $R_7$, and $R_8$ may be hydrogen atoms or alkyl groups with one to 4 carbon atoms, whereby either $R_3$ and $R_4$ or $R_7$ and $R_8$ must equal H.

The styrene-diene copolymer or alkylstyrene-diene copolymer used may be of various compositions. Thus it is, for example, possible to add styrene-diene copolymers or alkylstyrene-diene copolymers which show a statistical distribution of the monomers, and, at the same time, the proportion of styrene or proportion of alkyl styrene should in general not exceed 95% by weight and equally the proportion of diene should not exceed 95% by weight i.e., the proportion of styrene or alkyl styrene should, in general, be within the range 5% to 95% by weight.

It is also possible to use styrene-diene block copolymers or alkylstyrene-diene block copolymers as well as styrene-diene graft polymers or alkylstyrene-diene graft polymers which are for example accessible by grafting styrene or alkylstyrene onto a polydiene latex.

It is particularly advantageous to use copolymers of styrene and butadiene.

The copolymers have a mean molecular weight $\overline{M}_w$ of at least 10,000.

The admixture of the styrene-diene copolymer or alkylstyrene-diene copolymer, hereafter described as copolymer, to the polyester composition may be effected in various ways, with procedures (a) and (b) being preferred.

(a) The polyester is fused together with the copolymer, appropriately under nitrogen. After fusing the mixture is intensively stirred, optionally in vacuo.

(b) The polyester is fused and optionally post-condensed to the desired viscosity in vacuo in the melt. The copolymer is then added and intensively stirred in, appropriately under nitrogen. The melt is optionally further stirred in vacuo.

(c) The polyester granules or polyester powder are mixed with the copolymer as uniformly as possible, fused in an extruder, extruded whilst cooling, and granulated.

(d) Polyester granules are coated with a film of the copolymer, for example by rolling the polyester granules with a solution of the copolymer in benzene in a rotating vessel and evaporating off the solvent whilst rolling the granules. Mixing is effected by the screw of the injection molding machine when processing the polyester molding composition into a shaped article.

The desired properties of the polyester molding compositions depend on the compositions of the copolymer and on the amount added.

The polyester composition appropriately contains nucleating agents which are known to increase the speed of crystallisation of the polyester composition and result in the polyester shaped article reaching a good degree of crystallinity. Finely divided inorganic substances such as calcium carbonate. A silicate or talc may, in a known manner, be used as nucleating agents.

The addition of the nucleating agent may take place at various points of the process of manufacture of the polyester molding composition. Thus the nucleating agent can, for example, be added during the manufacture of the polyester, in the course of the polycondensation. The nucleating may also be admixed to the polyester together with the copolymer. Furthermore, the granulated polyester molding composition may be rolled with the nucleating agent and optionally fused in an extruder, extruded whilst cooling and again granulated.

The polyester molding composition should contain as little moisture as possible, preferably less than 0.01% by weight.

In order to keep the moisture uptake of the granules low the granulated polyester molding composition can appropriately be provided with a coating of an inert hydrophobic substance, such as for example paraffin or wax.

The polyester mixtures according to the invention may be thermoplastically processed into dimensionally stable shaped articles which, whilst having good surface hardness, good solvent resistance and low moisture uptake, are distinguished by a particularly high impact strength.

In order to achieve crystalline or partially crystalline shaped articles the mold temperature must be chosen to be sufficiently high above the second-order transition temperature of the polyester material employed.

The following examples serve to illustrate the invention, but they are not intended to limit it thereto.

EXAMPLE 1

Styrene was grafted onto a polybutadiene latex. The graft polymer contained 15% of polybutadiene and 85% of polystyrene and had a mean molecular weight $\overline{M}_w$ of 200,000. 120 g. of the graft copolymer and 3.88 kg. of polyethylene terephthalate (reduced specific viscosity dl./g. 0.85, measured in a 1% strength solution in phenol/tetrachlorethane, 60:40) were stirred for 1 hour at 280° C. at a pressure of 0.1 mm. Hg 3.5 kg. of the granulated and dried mixture were rolled with 0.8 g. of aluminium silicate powder (47% $SiO_2$, 38% $Al_2O_3$) (75% less than 2µ particle size) for 2 hours at room temperature with exclusion of moisture, and then rolled for 3 hours with 16.0 g. of paraffin (drop point 56° C.) at 90° C. Sheets of dimensions 60 x 60 x 1 mm. and of good dimensional stability were injection molded from the material (mold temperature 150° C.). The impact strength of the sheets was tested by a drop test. Herein, the test sheets were subjected to an impact stress by allowing a falling body sliding on low-friction tracks to fall from various heights vertically onto the sheets clamped in a frame. The tip of the falling body consisted of a hemisphere of radius r=10 mm. 10 sheets were tested for each height. The results are summarised in the Table 1.

Microtome sections were produced from the molding composition and these were extracted for several hours in a Soxhlet with boiling toluene. No copolymer was detected in the extract.

In a comparison experiment, the polyethylene terephthalate was treated as described above, but with the difference that no copolymer was added. The result of the drop test is reproduced in Table 1.

EXAMPLE 2

3.94 kg. of polyethylene terephthalate (reduced specific viscosity dl./g. 0.89, measured in a 1% strength solution in phenol/tetrachlorethane, 60:40, at 25° C.) were stirred for 1 hours at 275° C. and at a pressure of 0.1 mm. Hg. The melt is covered with dry nitrogen. 60 g. of a copolymer of styrene and butadiene with a proportion of styrene of 30% by weight and a mean molecular weight $\overline{M}_w$ 100,000 were then added. The mixture was stirred for half an hour at 275° C. and at a pressure of 0.1 mm. Hg. 3.50 kg. of the granulated polyester molding composition were rolled for 1 hour at 100° C. and at a pressure of 0.3 mm. Hg, then for half an hour at 100° C. and a pressure of 0.3 mm. Hg, then for half an hour at 150° C. and 0.3 mm. Hg and finally for 5 hours at 240° C. and 0.3 mm. Hg. The polyester molding composition was allowed to cool under nitrogen. It was then rolled for 2 hours under nitrogen with 7.0 g. of aluminium silicate powder as in Example 1, and thereafter rolled for 3 hours with 14.0 g. of paraffin (drop point 56° C.) at 90° C.

The sheets obtained from the polyester molding composition were tested in the drop test described in Example 1. In a comparison experiment, polyethylene terephthalate was treated as described above but with the difference that no copolymer was added. The improvement in the impact strength may be seen in the results summarised in Table 1.

EXAMPLE 3

2 kg. of polyethylene terephthalate powder, RSV dl./ g.=1.43, measured in a 1% strength solution in phenol/ tetrachlorethane, 60:40, at 25° C., and having a particle size distribution of 100–750µ, were mixed with 50 g. of a polybutadiene/styrene graft copolymer (80% styrene, 20% butadiene), mean molecular weight $\overline{M}_w$=150,000, homogenized in an extruder (cylinder dwell time 1.5 minutes; 36 screw revolutions per minute) and subsequently granulated. Further processing and testing as in Example 1. Drop test, Table 1.

EXAMPLE 4

The procedure of Example 3 was followed but 20 g. of the graft polymer described therein were used.

EXAMPLE 5

The procedure of Example 3 was followed but 80 g. of the graft polymer described therein were used.

EXAMPLE 6

The procedure of Example 3 was followed but 50 g. of a copolymer of 75% butadiene and 25% styrene, having a medium molecular weight $\overline{M}_w$ of 100,000 were employed.

TABLE 1

| Polyester | Copolymer admixed | Amount of the copolymer added, in percent by weight | Drop height F 20,[1] cm. |
|---|---|---|---|
| Polyethylene terephthalate | From Example 1 | 3 | 120 |
| Polyethylene terephthalate (Example 1) | | | 40 |
| Polyethylene terephthalate | From Example 2 | 1.5 | 135 |
| Polyethylene terephthalate (Example 2) | | | 55 |
| Polyethylene terephthalate | From Example 3 | 2.5 | 130 |
| Do | From Example 4 | 1 | 95 |
| Do | From Example 5 | 4 | 170 |
| Do | From Example 6 | 2.5 | 115 |

[1] Height at which the impact energy suffices to cause fracture in 20% of the sheets.

We claim:
1. Thermoplastic molding compositions consisting essentially of a mixture of (a) linear saturated polyesters consisting essentially of terephthalic acid esters of diols selected from saturated aliphatic diols and cyclohexane 1,4-dimethylol, said polyesters having a reduced specific viscosity of 0.6 to 2.0 as measured at a 1% concentration in a 60:40 mixture of phenol and tetrachloroethane at 25° C. and (b) from 0.1 to 30% by weight, based on the total weight of the mixture, of a copolymer of 5% to 95% by weight of a styrene of the general formula:

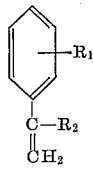

in which $R_1$ is hydrogen or an alkyl group of 4 to 12 carbon atoms and $R_2$ is hydrogen or an alkyl group of 1 to 4 carbon atoms, and an aliphatic conjugated diene of the formula

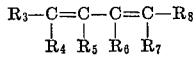

in which $R_3$, $R_4$, $R_5$, $R_6$, $R_7$ and $R_8$ may be hydrogen or alkyl groups with 1 to 4 carbon atoms, provided that at least one of $R_3$ and $R_4$ or $R_7$ and $R_8$ must be hydrogen, said copolymer having a mean molecular weight of at least 10,000.

2. Thermoplastic molding compositions as claimed in claim 1, which contain polyethylene-glycol terephthalate as linear saturated polyester.

3. Thermoplastic molding compositions as claimed in claim 1, which contain polycyclohexane-1,4-dimethylol-terephthalate as linear saturated polyester.

4. Thermoplastic molding compositions as claimed in claim 1, wherein the linear saturated polyester contains, in addition to terephthalic acid, other aromatic and/or aliphatic dicarboxylic acids.

5. Thermoplastic molding compositions as claimed in claim 1, wherein the polyester contains ethylene glycol as the saturated aliphatic diol.

6. Thermoplastic molding compositions as claimed in claim 1, wherein the polyester contains, in addition to ethylene glycol, other aliphatic diols.

7. Thermoplastic molding compositions as claimed in claim 1, wherein the copolymer consists of units derived from styrene and butadiene.

References Cited
UNITED STATES PATENTS 3,439,063    4/1969    Reilly    260—873

FOREIGN PATENTS 6,511,744    2/1967    Netherlands.
1,182,820    12/1964    Germany.
632,544    11/1963    Belgium.

WILLIAM SHORT, Primary Examiner

M. GOLDSTEIN, Assistant Examiner